United States Patent Office 2,938,039
Patented May 24, 1960

---

2,938,039

METHOD OF PREPARING 1-(CHROMONYL-3)-1-(4-HYDROXYCOUMARINYL-3)-METHANE AND ITS DERIVATIVES

Karel Fučík, Tocna-Komorany, Czechoslovakia, assignor to Spofa, spojené farmaceutické závody, národní podnik, Prague, Czechoslovakia, a corporation of Czechoslovakia No Drawing. Filed Feb. 25, 1957, Ser. No. 641,824

Claims priority, application Czechoslovakia Mar. 10, 1956

10 Claims. (Cl. 260—343.2)

The preparation of (chromonyl-3)-(4-hydroxycoumarinyl-3)-methane and its alkyl, aralkyl or furyl derivatives by cyclization of the corresponding 1-(4-hydroxycoumarinyl-3)-2-salicoyl ethanes with sodium and an alkyl formate is described in Czechoslovakian Patents Nos. 85,537, 85,585, 85,654 and 85,734.

It has been found, however, that the reaction often does not run smoothly and that the yields of the desired products are frequently very low, sometimes under 20 percent. The process was not easy to control regularly, and isolation from contaminating by-products was laborious. A substantial part of the metallic sodium remained unaltered in the reaction mixture and the treatment of the mixture on an industrial scale was thus sometimes rather dangerous.

Particularly the treatment of substances which are insoluble in alkyl formates, such as the treatment of 3-(2-salicoyl-1-methylethyl)-4-hydroxycoumarin, was difficult. The cyclization of 1-(salicoyl)-2-(4-hydroxycoumarinyl-3)-propyl-thioalkyl ethers could not be carried out at all under conditions stated in the above mentioned patents.

It has now been found, that all difficulties mentioned above may be avoided and further new derivatives of this kind, not obtainable hitherto, may be prepared, if the cyclization with an alkyl formate and sodium is carried out in the presence of a little amount, e.g. about 0.5–1 percent of a lower aliphatic alcohol which may be different from or identical to that forming part of the formate used. An arylaliphatic alcohol such as benzyl alcohol, or a phenol may be used instead of a lower aliphatic alcohol. These organic hydroxy compounds may be added as such or in the form of sodium alcoholates or phenolates.

The cyclization runs quite smoothly in the presence of said additives and may be easily mastered even on an industrial scale. The yields obtained are as high as 80–88 percent of the theoretical amount. The reaction proceeds probably in the following steps:

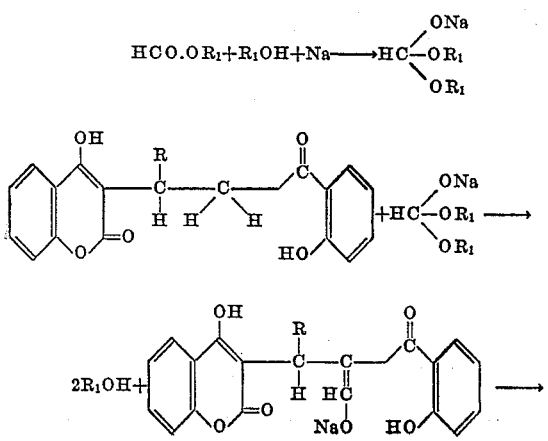

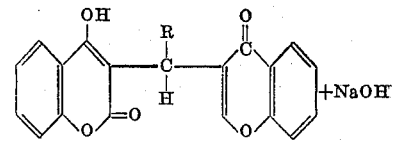

Thus, according to the present invention a method of preparing (chromonyl-3)-(4-hydroxycoumarinyl-3)-methanes of the general formula

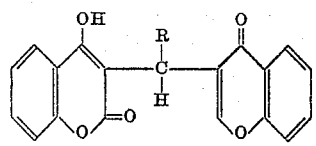

where R is the hydrogen atom, alkyl group, aralkyl group, thioether group $-(CH_2.S.R^1)$, ether group $-(CH_2.O.R^1)$, carboxyl group, carboxylic ester group $-(COOR^1)$, phenyl or a substituted phenyl group, and $R^1$ is an alkyl with 1 to 6 carbon atoms, consists in cyclizing 1-(4-hydroxycoumarinyl-3)-2-(salicoyl)-ethane of the general formula

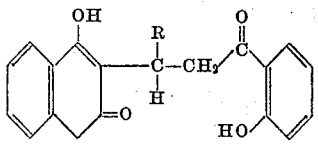

where R has the same meaning as above stated, with an ester of formic acid, sodium and a small amount of an aliphatic compound, an arylaliphatic compound, an aromatic hydroxy compound or a sodium salt of any of these compounds.

Also, according to the present invention, a method of preparing (chromonyl-3)-(4-hydroxycoumarinyl-3)-methanes of the general formula

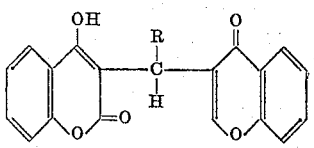

where R is 1-(4-hydroxycoumarinyl-3)-2-salicoyl propionic acid or the ester or the lactone thereof, consists in cyclizing 1-(4-hydroxycoumarinyl-3)-2-salicoyl ethane of the general formula

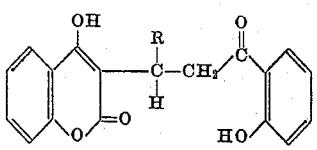

where R has the same meaning as stated above, with an ester of formic acid, sodium and a small amount of an aliphatic compound, an arylaliphatic compound, an aromatic hydroxy compound, or a sodium salt of any of these compounds.

The products obtained according to this invention possess a very strong and protracted anticoagulant activity. Some of them surpass in this respect all anticoagulants known hitherto and their toxicity is comparatively low, so that they may be used as very efficient drugs.

The favorable action of alcohols may be explained by the formation of sodium salts of beta-disubstituted vinyl alcohols (see the above-illustrated formulation of the process, Step III). These sodium salts are soluble in the reaction mixture, so that the primarily suspended compound, which is to be cyclized, passes gradually into the solution. The final product precipitates from the solution as a sodium salt after cyclization is complete. The pH value of the solution is thereby changed, since sodium hydroxide is being made free (see above Equation III), from the original 6.5 to a strong alkaline reaction. This change of pH indicates the course and end of the reaction.

The alkyl formate, used simultaneously as reaction component and as medium, must not contain more water than 0.02–0.06 percent. The content of free formic acid must not surpass 0.1–0.14 percent. The alcohol is added advantageously shortly before the beginning of the reaction, i.e. before the metallic sodium is thrown into the mixture.

The reaction is exothermic and an appropriate cooling is necessary. The temperature during the reaction is most advantageously kept between 6 and 15° C.

EXAMPLES (1) *The preparation of 1-(chromonyl-3)-1-(4-hydroxycoumarinyl-3)-ethyl-thiomethyl ether*

60 grs. of 1-(salicoyl)-2-(4-hydroxycoumarinyl-3)-ethylthiomethyl ether are suspended in 600 ccs. of ethyl formate, which has been previously cooled to 6° C. 6 ccs. of ethanol are then added. During the course of one hour 22.4 grs. of sodium are thrown into the mixture in three portions. The intrinsic temperature increases gradually to 9–15° C. and after about two hours the suspended compound passes into the solution. A short time thereafter the sodium salt of the cyclized product begins to precipitate, this occurring before all the sodium is consumed. The pH value is simultaneously increased from 6.5 to the alkaline side; after reaching the pH-value of 8.5, all sodium is dissolved and the reaction is finished. The temperature in this phase is kept between 6 and 8° C. by cooling. The reaction mixture is then diluted with water, the upper ester layer separated and the aqueous bottom layer slowly acidified with hydrochloric acid to pH 2. The precipitated product is filtered off by suction, washed with water and then boiled 30 minutes with acetone, filtered and left to crystallize. The yield amounts to 49.2 grs., i.e. 80 percent.

The 1-(chromonyl-3)-1-(4-hydroxycoumarinyl-3)-ethyl-thiomethyl ether obtained is a colorless crystalline matter melting at 126° C. It shows no fluorescence in short wave light and may be determined by paper chromatography by the Fucik method. The substance is tasteless and possesses a characteristic spectrum.

(2) *Preparation of 1-(chromonyl-3)-1-(4-hydroxycoumarinyl-3)-ethyl-thioethyl ether*

150 grs. of 1-(salicoyl)-2-(4-hydroxycoumarinyl-3)-propyl-thioethyl ether are suspended in 1500 ccs. of ethyl formate, which has been previously cooled down to 6° C. 15 ccs. of absolute ethanol are then added and 58.7 grs. of finely cut sodium are thrown in during the course of one hour in three portions. This amount corresponds to 6 mols of sodium on 1 mol of the substance to be cyclized. The temperature of the mixture increases slowly and after two hours the suspended starting material is dissolved. The temperature in this phase is permitted to increase to 9–15° C.

A short time thereafter the product of cyclization begins to separate, although all sodium is not yet consumed. The pH-value changes simultaneously from 6.5 over to the alkaline side. When pH 8.5 is reached, the sodium is consumed and the reaction finished. The temperature in this phase of the process is kept below 10° C.

The reaction mixture is then shaken out with 1500 ccs. of water, if desired under nitrogen gas. The top ester layer is separated and shaken out with a little amount of water. The extract thus obtained is added to the aqueous bottom layer. The bottom layer contains the desired product dissolved in the form of its sodium salt. The ethyl formate from the top layer is regenerated by drying and distilling. The aqueous layer is cautiously acidified with hydrochloric acid to pH 2. The product is precipitated in the form of an oil, which solidifies when left standing. The solidification may be aided by adding some sodium chloride. The product is comminuted in the mother liquor, sucked off, washed and dried. The yield of the raw product amounts to 150 grs.

The pure substance may be isolated in following way: 150 grs. of the raw material are boiled with 200 ccs. of ethanol, sucked without being cooled and washed with a small amount of ethanol. The remainder weighs 120 grs. A further 8–10 grs. are obtained from the mother liquor by cooling it down and the total yield is then 128–130 grs. The remaining alcoholic mother liquor is thickened by evaporation. After standing for 24 hours a precipitate is formed, consisting of the uncyclized starting material in the mixture with the cyclized product. This precipitate is used for preparing a new batch.

The main product (128–130 grs.) is recrystallized either from ethanol (1 part of the product on 25 parts of ethanol) or from acetone (1 part of the product on 10 parts of acetone). The yield amounts to 90 percent in the first case and to 78 percent in the second case. The acetone used must be free of aldehydes.

(3) *The preparation of 1-(chromonyl-3)-1-(4-hydroxycoumarinyl-3)-ethyl-thio-n-propyl ether*

4 grs. of 1-(salicoyl)-2-(4-hydroxycoumarinyl)-3-propyl-thio-n-propyl ether (M.P. 144° C.) are suspended in 50 ccs. of ethyl formate at 8° C. 0.5 cc. absolute ethanol and thereafter 1.4 grs. of sodium are added during the course of one hour while stirring. The reaction runs in a similar manner as those described in the foregoing examples. The reaction product is precipitated from its aqueous solution by acidification. The product, oily at first, solidifies later on. It is sucked off, washed and dried. The raw product thus obtained is dissolved in acetone, boiled for one hour under reflux cooling conditions and filtered. A pure crystalline product is obtained after cooling. The product melts at 139° C., its hydrate at 120° C. The substance extinguishes in short wave light.

(4) *Preparation of 1-(chromonyl-3)-1-(4-hydroxycoumarinyl-3)-ethyl-thioisopropyl ether*

39.8 grs. of 1-(salicoyl)-2-(4-hydroxycoumarinyl-3)-ethyl-thioisopropyl ether (M.P. 146° C.) are suspended in 400 ccs. of ethyl formate and 4 ccs. of absolute ethanol at 8° C. Thereafter 13.8 grs. of sodium are added during the course of one hour and in three portions while stirring. The temperature of the mixture is kept by cooling between 8 and 12° C. After the reaction is finished the mixture is treated as in the foregoing examples. The 1-(chromonyl-3)-1-(4-hydroxycoumarinyl-3)-ethyl-thioisopropyl ether thus obtained melts at 164° C. It may be recrystallized from methanol or from acetic acid.

(5) *Preparation of 1-(chromonyl-3)-1-(4-hydroxycoumarinyl-3)-ethyl-thioallyl ether*

38 grs. of 1-(salicoyl-2-(4-hydroxycoumarinyl-3)-propyl-thioallyl ether are suspended in a mixture of 380 ccs. of ethyl formate and 3 ccs. of absolute ethanol. 13.8 grs. of sodium are added during the course of one hour and in three portions. After the reaction is finished, the product is shaken out into water, precipitated by acidification, sucked off and dried. The raw product thus obtained is suspended in 2 parts of ethanol and boiled for 30 minutes under reflux conditions. The 1-(chromonyl-3)-1-(4-hydroxycoumarinyl-3)-ethyl-thioallyl ether obtained melts at 126° C.

(6) *Preparation of 1-(chromonyl-3)-1-(4-hydroxycoumarinyl-3)-ethyl-thio-n-butyl ether*

41 grs. of 1-(salicoyl)-2-(4-hydroxycoumarinyl-3)-propyl-thio-n-butyl ether are suspended in a mixture of 410 ccs. of ethyl formate and 4 ccs. of absolute ethanol. The temperature of the mixture is 8° C. 13.8 grs. of sodium are added during the course of one hour and in three portions. The inner temperature is kept between 8 and 10° C. by moderate cooling. After cyclization is finished the product is isolated as in the foregoing examples. The raw material is boiled 30 minutes with ethanol under reflux conditions, cooled down, sucked off and recrystallized from acetic acid. The pure substance melts at 141° C. A sample of 0.005 gr., on which 2 ccs. of concentrated sulfuric acid are poured, must exhibit no yellow color.

(7) *Preparation of 1-(chromonyl-3)-1-(4-hydroxycoumarinyl-3)-ethyl-thioisobutyl ether*

36.6 grs. of 1-(salicoyl)-2-(4-hydroxycoumarinyl-3)-propyl-thioisobutyl ether are suspended in 360 ccs. of ethyl formate at 8° C. After addition of 2.5 ccs. of absolute ethanol, 13.8 grs. of metallic sodium are thrown in during the course of one hour and in three portions. The temperature is kept between 8 and 12° C. by cooling, the mixture being strongly agitated. After the reaction has finished, the mixture is shaken out with water and the aqueous layer precipitated by acidification. The separated crystals are sucked off and dried. The purification is carried out by boiling with two parts of ethanol under reflux conditions. The pure substance melts at 103° C.

(8) *Preparation of 1-(chromonyl-3)-1-(4-hydroxycoumarinyl-3)-ethyl-thioisoamyl ether*

42.6 grs. of 1-(salicoyl)-2-(4-hydroxycoumarinyl-3)-propyl-thioisoamyl ether (M.P. 105–106° C.) are suspended in a mixture of 430 ccs. of ethyl formate and 4 ccs. of absolute ethanol. The suspension is cooled down to 8° C. and 13.8 grs. of sodium are thrown in during the course of one hour and in three portions. The temperature is kept between 8 and 12° C. After the reaction is complete, the mixture is treated according to the preceding examples. The product obtained has a melting point of 102–103° C. It may be recrystallized from acetic acid or from methanol.

(9) *Preparation of 1-(chromonyl-3)-1-(4-hydroxycoumarinyl-3)-ethane*

600 grs. of 1-(salicoyl)-2-(4-hydroxycoumarinyl-3)-propane are suspended in a mixture of 6000 ccs. of ethyl formate and 60 ccs. of absolute ethanol at 6° C. 255 grs. of sodium are thrown into the mixture in three portions during the course of one hour. The slowly rising temperature is kept between 9 and 15° C. by moderate cooling. After two hours the suspended substance is dissolved, although all sodium is not yet consumed. After a short period of time the cyclization product begins to separate. The pH-value of the mixture changes gradually from 6.5 to 8.5 and all sodium is eventually consumed. The temperature is kept in this phase at 6–8° C. The reaction mixture is mixed with 6000 ccs. of water, and the aqueous layer is separated and acidified to pH 2. An oily product is precipitated, which soon solidifies in the form of a crystalline body. The raw product is sucked off, washed with water and dried. The yield amounts to 618 grs. The comminuted raw product is boiled 30 minutes with 600 ccs. ethanol under reflux conditions and then sucked off. There separates from the mother liquor a small amount of the product, which may be added, after having been tested by short wave light, to the main product. The total yield amounts to 480 grs., i.e. 78.6 percent. The substance melts at 178° C.

The product may be recrystallized from acetic acid (3 parts of acetic acid to one part of the substance) with a yield of 95 percent. When recrystallized from ethanol (75 parts of ethanol on one part of the substance), the yield is 85 percent. The recrystallized product melts at 178–179° C. It is a colorless, crystalline, tasteless powder, exhibiting no yellowish green fluorescence in short wave light. The substance may be detected by paper chromatography by the Fucik method.

(10) *Preparation of (chromonyl-3)-(4-hydroxycoumarinyl-3)-methane*

310 grs. of 1-(salicoyl)-2-(4-hydroxycoumarinyl-3)-ethane are suspended at 6° C. in 3100 ccs. of methyl formate and 31 ccs. of absolute methanol. 138 grs. of sodium are then introduced during the course of one hour and in three portions. Further treatment is carried out in the same way as in the preceding examples. The raw product is boiled for 30 minutes with ethanol under reflux conditions and recrystallized either from pyridine or from acetic acid. The pure substance melts at 246° C. The yield amounts to 290 grs., i.e. 90.6 percent of the theoretical value.

(11) *Preparation of (chromonyl-3)-(4-hydroxycoumarinyl-3)-phenylmethane*

150 grs. of 1-(salicoyl) - 2 - (4 - hydroxycoumarinyl-3)-2-phenyl ethane (M.P. 191–192° C.) are suspended in 1500 ccs. of ethyl formate. Thereafter 10 ccs. of absolute ethanol are added and the whole is cooled down to 8° C. while stirring. During the course of one hour 52 grs. of sodium are added in a plurality of portions. The inner temperature of the mixture is kept between 8 and 12° C. by moderate cooling. After about two hours the suspended starting material is dissolved, although all sodium is not yet consumed. The mixture is stirred further, whereat the pH-value rises from the initial value of 6.2 up to 8.6. In this phase of the reaction all sodium is dissolved. The mixture is shaken out with water and the formate is recovered from the top layer. The aqueous layer is acidified to pH 2 and the precipitate is sucked off, washed and dried. The raw material is boiled for 30 minutes with ethanol under reflux conditions and sucked off when still warm. The product on the filter is recrystallized from acetic acid (15 parts of acetic acid to 1 part of the substance). The yield of the (chromonyl-3)-(4-hydroxycoumarinyl-3)-phenyl methane thus obtained amounts to 130 to 135 grs. The elementary analysis proves the general formula $C_{25}H_{16}O_5$.

(12) *Preparation of (chromonyl-3) - (4-hydroxycoumarinyl-3)-p-chlorophenyl methane*

42 grs. of 1-(salicoyl)-2-(4-hydroxycoumarinyl-3)-2-p-chlorophenyl ethane (M.P. 180° C.) are suspended in 420 ccs. of ethyl formate. 5 ccs. of absolute ethanol are then added and the whole is cooled down to 8° C. During the course of one hour 14 grs. are added of sodium in three portions, whereat the temperature is kept between 8 and 12° C. by moderate cooling. After about two hours the suspended substance is dissolved and the sodium is gradually consumed, whereat the pH value increases from 6.2 up to 8.6. The reaction mixture is shaken out with water, the ethyl formate is recovered from the top layer, and the bottom aqueous layer is acidified to pH 2. The precipitate is heated with water, sucked off, washed with water and dried. The raw product thus obtained is then boiled for 30 minutes with ethanol under reflux conditions and sucked off while yet warm. The substance on the filter is recrystallized from 15 parts of acetic acid. The (chromonyl-3)-(4-hydroxycoumarinyl-3)-p-chlorophenyl methane thus obtained melts at 219° C. The elementary analysis proves the general formula $C_{25}H_{15}O_5Cl$: The chlorine content was computed at 8.20 percent, and found to be 8.20 percent.

(13) *Preparation of 1-(chromonyl-3)-1-(4-hydroxycoumarinyl-3)-2-methoxyethane*

35.4 grs. of 1-(salicoyl)-1-(4-hydroxycoumarinyl-3)-2-methoxyethane are suspended in a mixture of 350 ccs. of ethyl formate and 3.5 ccs. of absolute ethanol. The suspension is cooled down to 6° C. 13.8 grs. of sodium are introduced into the mixture in three portions during the course of one hour and while stirring. Further treatment is carried out in the same way as in the foregoing examples. The raw product is isolated, after having been boiled with ethanol, and recrystallized from acetic acid. The yield amounts to 32 grs., i.e. 87 percent of the theoretical value. The substance is a colorless crystalline power, showing no yellowish-green fluorescence in short wave light. It may be detected by paper chromatography by the Fucik method.

(14) *Preparation of alkyl esters of (chromonyl-3)-(4-hydroxycoumarinyl-3)-acetic acid*

150 grs. of 1-(4-hydroxycoumarinyl-3)-2-salicoylpropionic acid ethyl ester (M.P. 144° C.) are suspended in 1500 ccs. of ethyl formate and 15 ccs. of absolute ethanol. The suspension is cooled down to 6° C. and 54.2 grs. of sodium are introduced during the course of thirty minutes and in three portions. The inner temperature rises slowly and the suspended substance dissolves in about two hours, which is before all the sodium disappears. The temperature is kept between 9 and 10° C. by cooling. A short time thereafter the cyclization product begins to separate and the pH-value changes thereat from 6.5 to 8.5. When the pH value of 8.5 is reached, all sodium is consumed and the reaction is finished. The reaction mixture is shaken out with 1500 ccs. of water, and the aqueous layer is separated and acidified to pH 2. The precipitated oily product solidifies after a short period of time, is comminuted, sucked off, washed with water and dried. The yield of this raw product is 150 to 152 grs. It is boiled with 150 ccs. of ethanol under reflux conditions for thirty minutes, sucked off while yet warm, washed with a small amount of ethanol and dried. The yield is 135 grs., i.e. 88.2 percent. After having been recrystallised from two parts of acetic acid the product melts at 177–178° C. and forms a colorless crystalline powder. The substance must display no yellowish-green fluorescence in short wave light. The substance has, like other compounds of this series, a characteristic spectrum. It is tasteless. The substance may be detected by paper chromatography by the Fucik method in as low amounts as 2 gamma. It forms an intense carmine-colored spot.

Further members of the homologous ester series may be prepared by using corresponding alkyl esters of the starting salicoyl compound. In order to avoid undesired transesterifications it is advantageous to use formates derived from the same alcohol. The alcohol itself, used as catalyst, is advantageously the same too. The method is entirely identical with that described in Example 14. The methyl ester melts at 189° C., n-propyl ester at 108° C., isopropyl ester at 130° C., n-butyl ester at 100° C., isobutyl ester at 118° C. Free (chromonyl-3)-(4-hydroxycoumarinyl-3)-acetic acid (M.P. 214° C.) has been prepared in a similar way by cyclization of 1-(4-hydroxycoumarinyl-3)-2-salicoyl propionic acid.

(15) *Preparation of alkyl esters of (chromonyl-3)-4-(hydroxycoumarinyl-3)-acetic acid from lactone of 1-(4-hydroxycoumarinyl-3)-2-salicoyl propionic acid.*

33.6 grs. of said lactone are suspended in 336 ccs. of ethyl formate at 6° C. 4 ccs. of absolute ethanol are added and 14 grs. of sodium are introduced during the course of one hour and in three portions. Further treatment is carried out as in the foregoing examples. There were obtained different esters corresponding to the nature of the starting materials; their melting points and other properties were identical with those of corresponding esters prepared according to Example 14.

Many of the derivatives prepared according to this invention possess high rhodenticide activity.

As an example 1-(4-hydroxycoumarinyl-3)-1-(chromonyl-3)-ethane has better activity against rats than 3 (α-phenyl-β-acetylethyl)-4-hydroxycoumarin.

I claim:
1. In a method of preparing (chromonyl-3)-(4-hydroxycoumarinyl-3)-methanes of the general formula

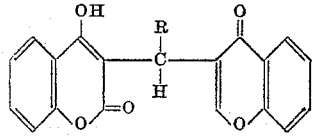

wherein R is a member of the group consisting of the hydrogen atom, alkyl radical, aralkyl radical, thioether radical ($CH_2SR^1$), ether radical ($CH_2OR^1$), carboxyl radical, carboxylic ester radical ($COOR^1$), phenyl radical, and chlorophenyl radical, and $R^1$ is an alkyl with 1 to 6 carbon atoms by cyclizing a 1-(4-hydroxycoumarinyl-3)-2-salicoyl ethane of the general formula

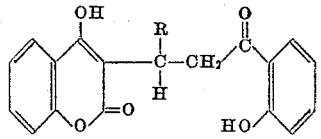

wherein R has the same meaning as above with an ester of formic acid, and sodium, the step of adding a small amount of a lower alkanol before the reaction begins.

2. A method according to claim 1 in which the temperature is kept low, namely between 0° C. and 20° C., by moderate cooling during the cyclization.

3. 1 - (chromonyl - 3) - 1 - (4 - hydroxycourmarinyl-3)-ethylthiomethyl ether.

4. 1 - (chromonyl - 3) - 1 - (4 - hydroxycoumarinyl-3) - ethylthioisopropyl ether.

5. 1 - (chromonyl - 3) - 1 - (4 - hydroxycoumarinyl-3)-ethylthioallylether.

6. (Chromonyl - 3) - (4 - hydroxycoumarinyl - 3)-phenylmethane.

7. (Chromonyl - 3) - (4 - hydroxycoumarinyl - 3)-p-chlorophenyl methane.

8. 1 - (chromonyl - 3) - 1 - (4-hydroxycoumarinyl-3)-2-methoxyethane.

9. Alkyl esters of (chromonyl-3)-(4-hydroxycoumarinyl-3)-acetic acid.

10. A compound selected from the group consisting of 1 - (chromonyl - 3) - 1-(4-hydroxycoumarinyl-3)-ethylthiomethyl ether, 1-(chromonyl-2)-1-(4-hydroxycoumarinyl-3)-ethylthioethyl ether, 1-(chromonyl-3)-1-(4-hydroxycoumarinyl-3)-ethyl-thio-n-propyl ether, 1-(chromonyl - 3) - 1-(4-hydroxycoumarinyl-3)-ethylthioisopropyl ether, 1-(chromonyl-3)-1-(4-hydroxycoumarinyl-3)-ethylthioallylether, 1-(chromonyl-3)-1-(4-hydroxycoumarinyl-3)-ethyl-thio-n-butyl ether, 1-(chromonyl-3)-1-(4-hydroxycoumarinyl-3)-ethylthioisobutyl ether, 1-(chromonyl - 3) - 1 - (4 - hydroxycoumarinyl - 3) - ethylthioisoamyl ether, (chromonyl-3)-(4-hydroxycoumarinyl-3)-phenylmethane, (chromonyl - 3)-(4-hydroxycoumarinyl-3)-(4-hydroxycoumarinyl-3)-p-chlorophenyl methane, 1-(chromonyl - 3)-1-(4-hydroxycoumarinyl-3)-2-methoxyethane, and alkyl esters of (chromonyl-3)-(4-hydroxycoumarinyl-3)-acetic acid.

References Cited in the file of this patent
UNITED STATES PATENTS
2,789,937    Fucik  ----------------- Apr. 23, 1957